United States Patent [19]
Andrews et al.

[11] Patent Number: 5,493,326
[45] Date of Patent: Feb. 20, 1996

[54] METHOD AND APPARATUS FOR SCAN LINE SKEW CORRECTION USING A GRADIENT INDEX ELECTROOPTIC PRISM

[75] Inventors: John R. Andrews; Frank C. Genovese, both of Fairport; James W. Lannom, Webster, all of N.Y.

[73] Assignee: Xerox Corporation, Stamford, Conn.

[21] Appl. No.: 178,177

[22] Filed: Jan. 3, 1994

[51] Int. Cl.$^6$ ........................................... B41J 2/47
[52] U.S. Cl. .............................. 347/257; 347/134; 359/95
[58] Field of Search ........................... 347/116, 134, 347/257, 258; 359/94, 95, 228

[56] References Cited

U.S. PATENT DOCUMENTS

| | | | |
|---|---|---|---|
| 4,213,158 | 7/1980 | DeBenedictis | 358/296 |
| 4,903,067 | 2/1990 | Murayama et al. | 346/160 |
| 4,958,914 | 9/1990 | Owechko et al. | 350/342 |
| 5,061,046 | 10/1991 | Lee et al. | 359/53 |
| 5,153,608 | 10/1992 | Genovese | 346/108 |
| 5,363,127 | 11/1994 | Andrews | 347/134 |
| 5,394,223 | 2/1995 | Hart et al. | 347/116 |

OTHER PUBLICATIONS

U.S. Patent Application Ser. No. 07/951,714 Inventor: Andrews, Filed: Sep. 25, 1992.

*Primary Examiner*—Mark J. Reinhart
*Attorney, Agent, or Firm*—Denis A. Robitaille

[57] ABSTRACT

An optical element for the selective scan line skew correction in a raster output scanner (ROS) of an electrostatographic printer. The optical element includes a chamber having a volume defined by parallel surfaces in substantially parallel planes containing a liquid crystal material having a variable index of refraction as a function of voltage applied thereacross. An inhomogenous electric field is generated through the liquid crystal material to produce a refractive index gradient along substantially perpendicular planes in the optical element. The ROS includes a control and feedback system coupled to a variable voltage source for applying a variable biasing voltage across the optical element to control the variable index of refraction of the liquid crystal material for selectively correcting scan line skew.

26 Claims, 6 Drawing Sheets

METHOD AND APPARATUS FOR SCAN LINE SKEW CORRECTION USING A GRADIENT INDEX ELECTROOPTIC PRISM

This invention relates generally to a raster output scanning system for producing electrostatic latent images from electronically stored data in, for example, an electrostatographic printing machine and, more particularly, concerns a refractive index gradient electrooptic prism generated by the use of inhomogeneous electric fields for providing electronic screw correction and alignment of a scan line on an imaging member.

The basic reprographic process used in an electrostatographic printing machine generally involves an initial step of charging a photoconductive member to a substantially uniform potential. The charged surface of the photoconductive member is thereafter exposed to a light image of an original document for selectively dissipating the charge thereon in selected irradiated areas. This procedure records an electrostatic latent image on the photoconductive member corresponding to the informational areas contained within the original document being reproduced. The latent image is then developed by bringing a developer material including toner particles adhering triboelectrically to carrier granules into contact with the latent image. The toner particles are attracted away from the carrier granules to the latent image, forming a toner image on the photoconductive member which is subsequently transferred to a copy sheet. The copy sheet having the toner image thereon is then advanced to a fusing station for permanently affixing the toner image to the copy sheet in image configuration.

The foregoing discussion generally describes a typical black and white or single color electrophotographic printing process. The approach utilized for multicolor electrostatographic printing is substantially identical to this process, with the exception that, rather than forming a single latent image on the photoconductive member in order to reproduce an original document, multiple latent images corresponding to different color separations are sequentially recorded on the photoconductive member. Each single color electrostatic latent image is developed with toner of a color complimentary thereto and the reprographic process described above is repeated for each of the differently colored images with a respective toner of complimentary color. Thereafter, each single color toner image is transferred to the copy sheet in superimposed registration with the prior toner image, creating a multi-layered toner image on the copy sheet. Finally, this multi-layered toner image is permanently affixed to the copy sheet in substantially conventional manner to form a finished color copy.

Electrostatographic printing machines have increasingly utilized digital electronic technology to produce output copies from input video data representing original image information. For example, it is known to use a raster output scanner (ROS) for exposing portions of the photoconductive member to record the electrostatic latent image thereon. Generally, the ROS has a laser for generating a collimated beam of monochromatic radiation. This light beam is modulated in conformance with image information in an input document and is directed toward the surface of the photoconductive member through an optics system to form the desired latent image on the photoconductive member. The optics system typically includes a rotating polygon having mirrored facets, such that the modulated light beam is reflected from a facet through a post-polygon scan lens and is thereafter focused to a "spot" on the photoconductive member. The rotation of the polygon causes the spot to scan linearly across the photoconductive member in a fast scan (i.e., scan line) direction. Meanwhile, the photoconductive member is advanced in a process direction orthogonal to the scan line direction at a speed relatively more slow than the rate of the fast scan, the so-called slow scan (i.e., process) direction. In this manner, the modulated light beam is scanned across the recording medium in the form of an array of scan lines in a raster scanning pattern, forming an image of the original input document.

In many printing machines, the sampling rate of the slow scan direction data is equivalent to 300 lines per inch or more. It has been shown that errors as small as 1% of the nominal line spacing in the slow scan direction may be recognized in a half tone or a continuous tone image. This implies a need for a high degree of control in positioning the scan line in the slow scan direction on the image plane, especially in such applications as multiple beam and multiple ROS color printers wherein a plurality of scan lines are written onto a single image panel on the photoreceptor.

In a single pass color xerographic system utilizing the above described digital electronic technology, a plurality of ROS stations are selectively energized to create successive image exposures corresponding to the three primary colors. A fourth ROS station may also be added for producing high quality process black images as well. Each image area on the photoconductive member makes at least three passes relative to an image scan line formed by the modulated laser beam of the ROS system to create a color output copy. Alternatively, highlight color applications might use process black plus one or two colors. Each image pass is eventually superimposed on one another in a manner such that each image must be precisely positioned within a tolerance of less than ±0.05 mm, and each color image must be registered in both the photoreceptor process direction (slow scan direction) as well as in the direction transverse to the process direction (fast scan direction). If a number of raster scan lines are superimposed on a document, as in the case of producing a color print, poor scan line positioning and alignment control will cause a noticeable interference pattern on the document, resulting in unacceptable copy quality.

As previously described, in a ROS based imaging system, a light beam is intensity-modulated in accordance with an input image. The light beam is modulated by a serial data stream at a rate such that individual picture elements ("pixels") of the image represented by the data stream are exposed on the photosensitive medium as a series of parallel lines for forming the latent image. Generally, this photosensitive medium takes the form of a drum or a belt. Proper alignment is necessary so that the parallel lines making up the image are formed perpendicular to the direction of travel of the photosensitive medium. However, it is difficult to achieve this perpendicular relationship, often resulting in a condition referred to as "scan line skew", wherein a scan line is shifted or sloped relative to the process direction of the photosensitive medium. Scan line skew errors occur if a scan line is not perpendicular to the direction of motion of the imaging member when positioned thereon, causing an image frame to effectively take the form of a parallelogram. Scan line skew problems may also occur when relative variation exists between the skew angle of one latent image with respect to another. Errors in scan line skew may arise from many sources, including polygon and/or photosensitive member motion flaws, facet and/or image plane (i.e., photoconductive member) surface defects, etc. This condition affects the image which is subsequently developed and transferred to an output print such that the resulting copy output will exhibit unacceptable image quality defects.

Scan line positioning and, in particular, skew alignment error correction is most commonly addressed in the prior art by passive or active in-line precision optics systems. Precision optics systems require not only high quality optical elements, but also tight control in the positioning of those optics in order to obtain the requisite very precise mechanical control sufficient to adjust scan line position as required in many cases. In order to achieve this high level of scan line position control with the acousto-optic modulators known in the art, an acoustic wave must be established and maintained with great precision. These acousto-optic modulators are relatively expensive and require a correspondingly accurate high frequency signal generator and related electronics to produce and maintain the acoustic waves. Alternatively, prior art systems which incorporate feedback circuits to provide mechanical reorientation of rotating or translating mirrors generally operate too slowly to correct for motion quality errors because mirror components are relatively bulky and are difficult to move precisely and quickly. The following disclosures appear to be relevant:

U.S. Pat. No. 4,213,158

Patentee: DeBenedictis

Issued: Jul. 15, 1980

U.S. Pat. No. 4,903,067

Patentee: Murayama et al.

Issued: Feb. 20, 1990

U.S. Pat. No. 4,958,914

Patentee: Owechko et al.

Issued: Sept. 25, 1990

U.S. 5,153,608

Patentee: Genovese

Issued: Oct. 6, 1992

U.S. patent application Ser. No. 07/951,714

Inventor: Andrews

Filed: Sept. 25, 1992

The relevant portions of the aforementioned disclosures are summarized as follows:

U.S. Pat. No. 4,213,158 discloses an optical data recording system utilizing acoustic pulse imaging to minimize image blur. That patent discloses a technique for utilization of an acousto-optic modulator in a laser scanning system wherein the laser beam incident on the acoustooptic modular interacts with the acoustic pulse, the writing beam is scanned across the surface of the recording medium and the system magnification is selected to be substantially equal to the ratio of the velocity of the writing beam to the velocity of the sound wave in the acousto-optic modulator to minimize image blurring on the surface of the recording medium.

U.S. Pat. No. 4,903,067 provides a multi-image forming apparatus for forming image data onto photosensitive drums by an electrophotographic system. The multi-image forming apparatus includes a control circuit for controlling the image forming circuit so as to form registration marks to match the positions of the images on the drums and detectors for detecting the recording positions of the registration marks. The apparatus further includes a correcting circuit so that the images formed on the photosensitive drums can be accurately formed on the transfer paper by reading and matching the position of the registration marks.

U.S. Pat. No. 4,958,914 discloses an optical intensity-to-position mapping and light deflector apparatus and method wherein a liquid crystal prism is used to deflect a light beam. Voltage gradients are varied in accordance with optical intensity at corresponding locations in the received light to correct any optical variations at that particular location. The prism of that patent deflects higher intensity light more than lower intensity light.

U.S. Pat. No. 5,153,608 discloses a skew and bow correction apparatus for a scanning system including an optical element having an axis along a line of beam scanning wherein the principle plane of the optical element can be oriented at a twist angle, the twist angle being related to the skew of the scan line for correction thereof.

Pending U.S. patent application Ser. No. 07/951,714, of common assignee, discloses an optical element for selective scan line skew correction in a raster output scanner (ROS) of an electrophotographic printer. The optical element includes a chamber containing a liquid crystal material having a variable index of refraction as a function of voltage applied thereacross, wherein the chamber has a volume defined by surfaces having progressively decreasing areas in substantially perpendicular planes. The ROS includes a control and feedback system coupled to a variable voltage source for applying a biasing voltage across the optical element to generate uniform electric fields across the chamber, thereby controlling the variable index of refraction of the nematic material for selectively correcting scan line skew.

According to the present invention, an optical element for selective skew correction of a scanning light beam transmitted therethrough is provided, comprising: a member including a pair of optically transmissive plate members defining a chamber therebetween; a liquid crystal material substantially filling the chamber, the liquid crystal material having a variable index of refraction responsive to an electric field therethrough; and means for generating an inhomogenous electric field through said liquid crystal material to produce a refractive index gradient across the optical element.

According to another aspect of the present invention, a raster output scanner for providing selective skew alignment correction is disclosed, comprising: means for generating a light beam modulated in accordance with a video input data signal; means for scanning the light beam onto a movable imaging surface being transported in a process direction to provide successive scan lines on the movable imaging surface; an optical element for selectively deflecting the light beam to correct scan line skew on the imaging surface as a function of voltage applied thereacross; and a voltage source for applying a biasing voltage across the optical element to generate the electric fields through the liquid crystal material such that the index of refraction of the liquid crystal material is varied as a function of the applied biasing voltage. The optical element of the present invention includes a member including a pair of optically transmissive plate members defining a chamber therebetween; a liquid crystal material substantially filling the chamber, the liquid crystal material having a variable index of refraction responsive to an electric field therethrough; and means for generating an inhomogenous electric field through the liquid crystal material to produce a refractive index gradient across the optical element.

According to yet another aspect of the present invention, there is provided an electrostatographic printing machine of the type in which a raster output scanner produces a modulated light beam wherein the modulated light beam is scanned across a movable photoconductive imaging surface being transported in a process direction for recording latent images thereon, comprising: means for generating a light beam modulated in accordance with a video input data signal; means for scanning the light beam onto a movable imaging surface being transported in a process direction to provide successive scan lines on the movable imaging surface; an optical element for selectively deflecting the light beam to correct scan line skew on the imaging surface as a function of voltage applied thereacross; and a voltage source for applying a biasing voltage across the optical element to generate the electric fields through the liquid crystal material such that the index of refraction of the liquid crystal material is varied as a function of the applied biasing voltage. The optical element of the present invention includes a member including a pair of optically transmissive plate members defining a chamber therebetween; a liquid crystal material substantially filling the chamber, the liquid crystal material having a variable index of refraction responsive to an electric field therethrough; and means for generating an inhomogenous electric field through the liquid crystal material to produce a refractive index gradient across the optical element.

Other features of the present invention will become apparent as the following description proceeds and upon reference to the drawings in which.

While the present invention will hereinafter be described in connection with a preferred embodiment thereof, it will be understood that this description is not intended to limit the invention to that embodiment. For example, although the invention is described with respect to a multicolor xerographic machine, the skew correction provided by the invention could also be incorporated into a black and white machine. Thus, it is intended that the present description of the invention cover all alternatives, modifications, and equivalents as may be included within the spirit and scope of the invention as defined by the appended claims.

Figure 8:
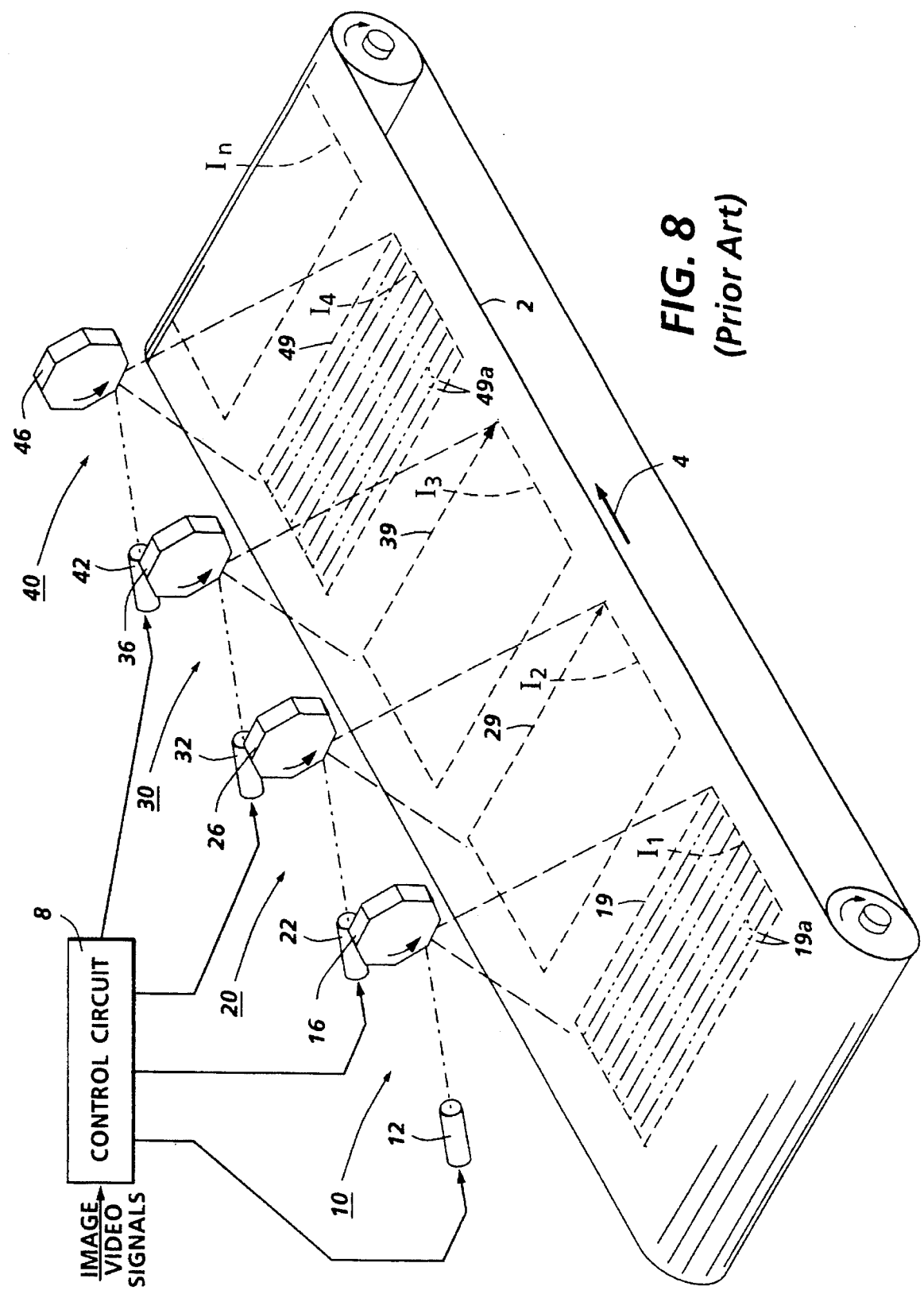
FIG. 8 shows a schematic perspective view of a prior art, single pass, multiple ROS system for forming a multicolor image in a xerographic machine.

Referring initially to FIG. 8, before describing the invention in detail, there is shown a prior art, single pass, laser multicolor printing system having four ROS systems, 10, 20, 30, and 40. The multicolor printing system includes a photoreceptor belt 2, driven in a process direction, indicated by the arrow 4. The length of the belt 2 is designed to accept an integral number of spaced image areas or so called image panels, $I_1-I_n$, represented by dashed line rectangles. Each image area $I_1-I_n$ has an associated charging station (not shown) for placing a predetermined electrical charge on the surface of belt 2 to be successively exposed by ROS systems 10, 20, 30 and 40, respectively. As each of the image areas $I_1-I_n$ reaches a transverse line of scan, represented by lines 19, 29, 39, 49, the image area is progressively exposed along closely spaced transverse raster lines, shown generally with exaggerated longitudinal spacing as reference numerals 19a and 49a on image areas $I_1$ and $I_4$, respectively.

Downstream from each exposure station, a development station (not shown) develops the latent image formed in the associated image area. A fully developed color image is then transferred to an output sheet. The charge, development, and transfer stations are conventional in the art. Details of charge and development xerographic stations in a multiple exposure, single pass system are disclosed, for example, in U.S. Pat. No. 4,660,059, the contents of which are hereby incorporated by reference.

Each ROS system 10, 20, 30, and 40 contains its own conventional scanning components, as variously described in the art. For purposes of simplicity, each ROS system 10, 20, 30, 40 is shown as having two components, namely, a laser light source 12, 22, 32, 42 and a rotating polygon 16, 26, 36, 46, respectively. It will be appreciated by those of skill in the art that multiple scan lines may also be generated with a single ROS.

An exemplary ROS system 10, includes a gas, or preferably, diode laser light source 12, having an output which is modulated by signals from control circuit 8, which output is optically processed to impinge on the facets of rotating polygon 16. Each facet reflects the modulated incident laser beam as it is rotated to produce a scan line which is focused at the photoreceptor surface 2. Control circuit 8 contains the circuit and logic modules which respond to input video data signals and other control and timing signals to operate the photoreceptor drive in synchronism with the image exposure and to control the rotation of the polygon 8 by a motor (not shown). The other ROS systems 20, 30, 40, have their own associated laser diodes 22, 32, 42, and polygons 26, 36, 46, respectively.

Figure 1:
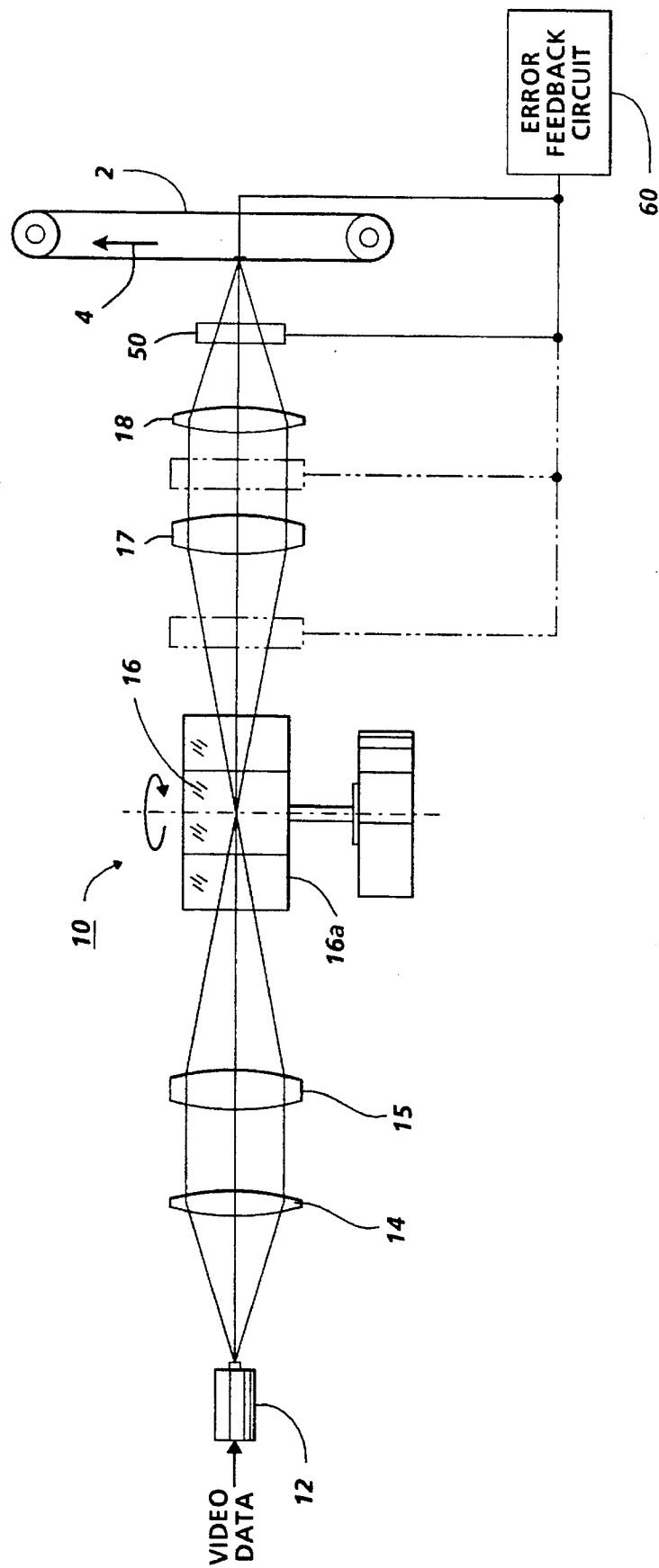
FIG. 1 shows a plan view of the general optical configuration of a Raster Output Scanner (ROS) system, showing an optical element according to the present invention disposed at various locations along the scan path of the ROS.

Moving now to a more detailed description of a ROS system used, for example, in an electrostatographic printing machine, FIG. 1 shows a general configuration of the optical system and the optical path of a ROS. For purposes of the present discussion, a single ROS system will be described in detail with reference to ROS system 10. It will be understood that each ROS system 20, 30, 40 may comprise similar components or may include other components, as the case may be. Initially, input video data is transmitted to the laser source 12 which embodies a self-modulating light source for producing a modulated diverging beam of coherent light. The beam may be collimated by a spherical or an aspherical collimating lens 14 and then refocused by a cylinder lens 15. Thereafter, the beam is incident upon a rotating polygon 16 having at least one mirrored facet 16a for reflecting the beam along a scan line through a post scan optics system. Other suitable devices for scanning are known in the art, including rotating holograms, diffraction gratings, etc. A recollimating lens 17 and a toroidal or cylindrical lens 18 can be disposed between the scanning device 16 and the photoreceptor 2 to correct for wobble (scanner motion or facet errors) and other defects where appropriate. The post scan optics system reconfigures the beam reflected by facet 16a to a circular or elliptical cross-section, refocuses the beam to the proper point on the surface of photoreceptor/drum 2, and corrects for scan nonlinearity (F-theta correction) as well as wobble defects.

In the exemplary embodiment of FIG. 1, the rotation of the mirrored facets 16a causes the reflected beam to be deflected and thereby scanned across a photosensitive image member or the photoreceptor belt 2. Thus, if polygon 16 is rotated in a clockwise fashion, a beam reflected from one of its moving facets 16a will be caused to scan from left to right on the photoreceptor belt 2. Polygon 16 is preferably driven by a motor (not shown) via a shaft, the angular velocity of the polygon 16 being synchronized with the angular velocity of belt 2. The combination of the rotation of polygon 16 with the movement of the photoreceptor belt 2 in the direction as shown by arrow 4, permits the latent image to be constructed by an array of scan lines exposed onto the photoreceptor surface in a raster manner. A typical ROS can illuminate the charged portion of imaging member 2 at a rate of about 600 pixels per inch; e.g. at 600 spi resolution.

The optical system described hereinabove discloses the basic elements of a raster output scanning system as is well known in the art. In accordance with the present invention, an additional optical element 50 is provided and disposed in the post-scan optics, subsequent to polygon 16, along the scan path of the optical system for deflecting the scan line such that the entire scan line may be manipulated and positioned on the imaging member, as desired. In FIG. 1, optical element 50 is shown at a position located between the magnification lens 18 and the imaging member 2. Alternatively, the optical element 50 of the present invention may be disposed between the F-theta correction lens 17 and the magnification lens 18 or between the rotating polygon 10 and the F-theta correction lens 17, as shown in phantom in FIG. 1. Placement of the optical element 50 in the post-scan optics is required for manipulating the entire scan line through the optical element 50 to provide proper alignment on the imaging member 2.

In accordance with the present invention, optical element 50 preferably includes a liquid crystal cell containing a liquid crystal material characterized by the existence of molecules which can be aligned to change the index of refraction in the liquid crystal cell, as is generally known in the art. In utilizing such a cell, light polarization is parallel to the alignment direction of the liquid crystal material, it will be understood that various liquid crystal materials may be utilized, such as, for example, parallel aligned nematic or smectic phase crystal materials among others. By way of example, the optical element 50 which is placed in the scan path of a ROS defines a chamber or cell adapted to contain a volume of the liquid crystal material therein, having a volume defined by a pair of substantially parallel planes. When a biasing voltage is applied to the optical element 50, electrical fields are formed across the chamber to produce a condition in which the molecules of the liquid crystal material in the chamber are aligned by the bias fields in a generally uniform direction with respect to the magnitude of the voltage applied to the optical element 50. The alignment of the molecules making up the liquid crystal material in this manner changes the index of refraction of the material, and thus, allows for electrical control of the index of refraction through the optical element 50.

Figure 2:
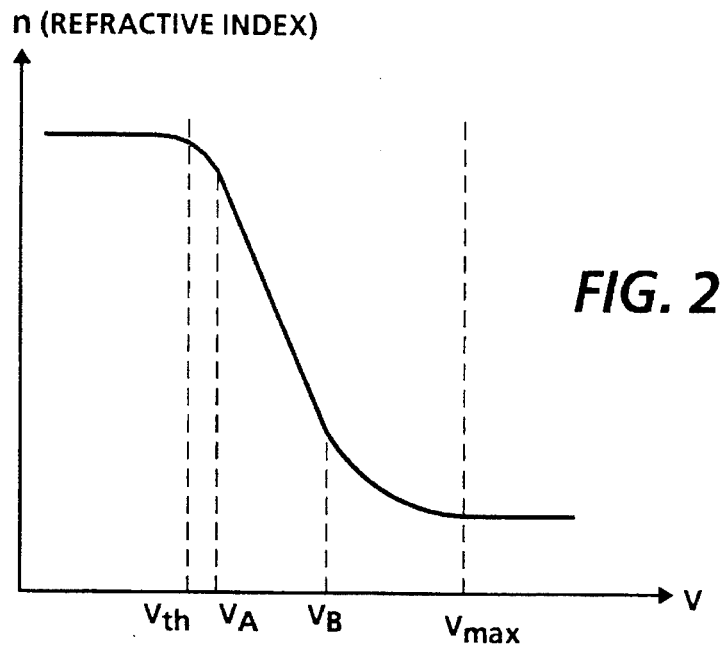
FIG. 2 shows a graphic representation of the relationship between the index of refraction and the voltage applied to a liquid crystal material.

The manner in which the refractive index of the liquid crystal material varies in response to a biasing voltage is shown in FIG. 2. Varying the magnitude of the biasing voltage across the cell allows for the refractive index $n_e$ of the liquid crystal material to be freely controlled for light polarized parallel to the alignment direction of the liquid crystal material. That is, when the level of the biasing voltage exceeds the threshold value $V_{th}$, the arrangement of the molecules in the liquid crystal material change from homogeneous toward homeotropic resulting in a corresponding change in the refractive index $n_e$. Thus, in terms of the ROS system shown in FIG. 1, as the biasing voltage applied to the optical element 50 is varied, electrical fields created by the biasing voltage cause the refractive index of the liquid crystal cell to change, thereby changing the angle at which the laser beam exits the optical element 50. This angle is continuously variable within the limits set by the available change in the refractive index.

Typically, a liquid crystal cell is made up of parallel plates which form a layer of liquid crystal material of uniform thickness therebetween. Such liquid crystal cells are known in the art and have been described variously, as for example, in U.S. Pat. Nos. 4,066,334 and 4,768,864, as well as the references cited therein, the entire contents thereof being incorporated herein by reference. In standard practice, liquid crystal cells are used to achieve specific electro-optic effects by placing a small amount of a specific liquid crystal material between two glass plates. For a range of angles of incidence on the liquid crystal interface, light is either partially transmitted or totally reflected, depending on the electric field induced orientation of the optic axis in the liquid crystal material.

Figure 3:
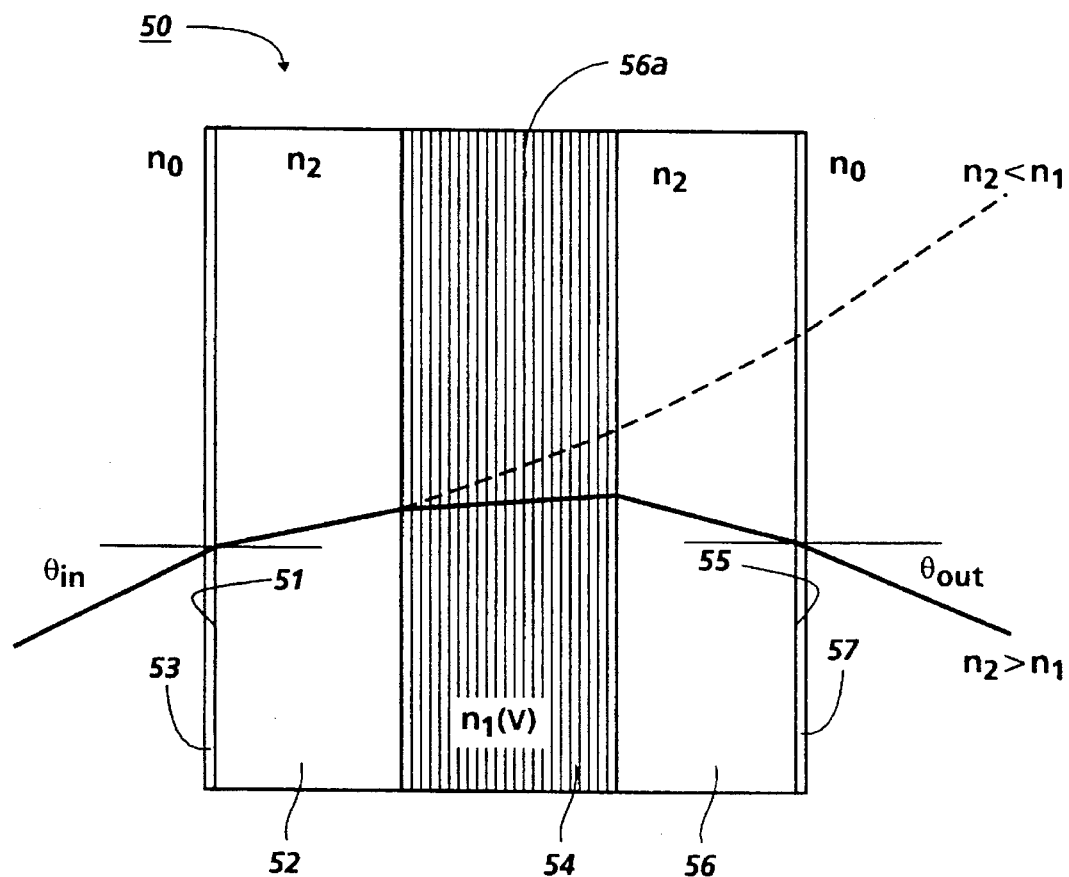
FIG. 3 shows a schematic side view of an optical element in accordance with the present invention.

FIG. 3 shows, in schematic form, a preferred embodiment of an optical element 50 in accordance with the present invention. The specific configuration of the optical element 50 of the present invention is defined by a two optically transmissive plates 52, 56 of substantially uniform thickness defining a chamber 54. The marginal edges of the chamber 54 are formed by planar interior surfaces 51, 55 of plates 52, 56 respectively. The plates 52, 56 comprise glass or some other optically transmissive materials. The chamber 54 is filled with a liquid crystal material, as for example, a commercially available nematic liquid crystal material produced by EM Industries of Hawthorne, N.Y., having a refractive index ranging from 1.33 to 1.79 depending on the voltage applied thereto. Since the chamber 54 contains a nematic material having a variable index of refraction with respect to voltage applied thereto, changing the voltage applied to the optical element 50 also results in a change in the angular deflection of light waves caused by the optical element 50, as illustrated in FIG. 3.

Transparent conductive electrodes 53 and 57 are provided for applying the biasing voltage across the chamber 54. In FIG. 3, conductive electrodes 53 and 57 are placed directly on the exterior faces of the two glass substrates 52, 56, respectively. Alternatively, the transparent electrodes 53 and 57 may be embedded into the plates. A typical transparent conductive material that may be utilized for providing these electrodes is Indium Tin Oxide (ITO). It will be understood by those of skill in the art that other materials may also be utilized. By applying a biasing voltage to the electrodes 53, 57 via a voltage source (not shown) electric fields are generated across the chamber 54 for inducing reorientation of the molecules of the liquid crystal material in the chamber 54 to provide electrical control of the refractive index (ne) thereof. A typical liquid crystal cell of the type described herein should have a maximum thickness of less than 300 micrometers. For the purposes of the present invention, a liquid crystal chamber having a maximum thickness of approximately 50 micrometers over a 1 mm aperture was utilized.

The qualitative aspects of the electrooptic effect provided by the optical element of the present invention can be explained by a simple application of Snell's Law:

$$N_i \sin \theta = N_i' \sin \theta_i'$$

It will be appreciated that calculations based on Snell's Law applied at each interface will yield an output angle as a function of the input angle and the refractive index of the material making up plates 52, 56 as well as the variable index of refraction of the liquid crystal material. In a typical application, the angular range covered by varying the voltage applied to the liquid crystal cell is in the range of 1 to 1.5 degrees. This angular range can be increased substantially for larger angles of incidence. Likewise, smaller angular ranges can be provided by reducing the refractive index change attainable with the liquid crystal material.

Having described a typical liquid crystal cell, attention will now be turned to the novelty of the present invention which is specifically directed toward an electrooptic prism created by generating an inhomogeneous electric field disseminated through a liquid crystal cell for creating a refractive index gradient to provide skew correction of a light beam using the variable refractive index materials in a liquid crystal cell as described hereinabove. A liquid crystal cell having a refractive index gradient causes the liquid crystal cell to have the effect of a prism so as to deviate the direction and propagation of a light beam therethrough. Thus, rather than using a prism or a bi-prism shaped optical element, which is dependent upon the physical structure of the element in combination with a uniform refractive index (which may indeed be a variable refractive index by utilizing a liquid crystal material within a prism shaped cell), an electrooptic prism is created by applying inhomogeneous electric fields across a liquid crystal cell having a uniform thickness. The optical power or deflection capability of the optical element 50 is derived from a refractive index gradient created by an electrically controllable electric field gradient which, in turn, creates the refractive index gradient. Linear variation of the electric field across the liquid crystal cell can be generated by replacing electrodes 53 and 57 described hereinabove with resistive electrodes, as will be described.

Figure 4:
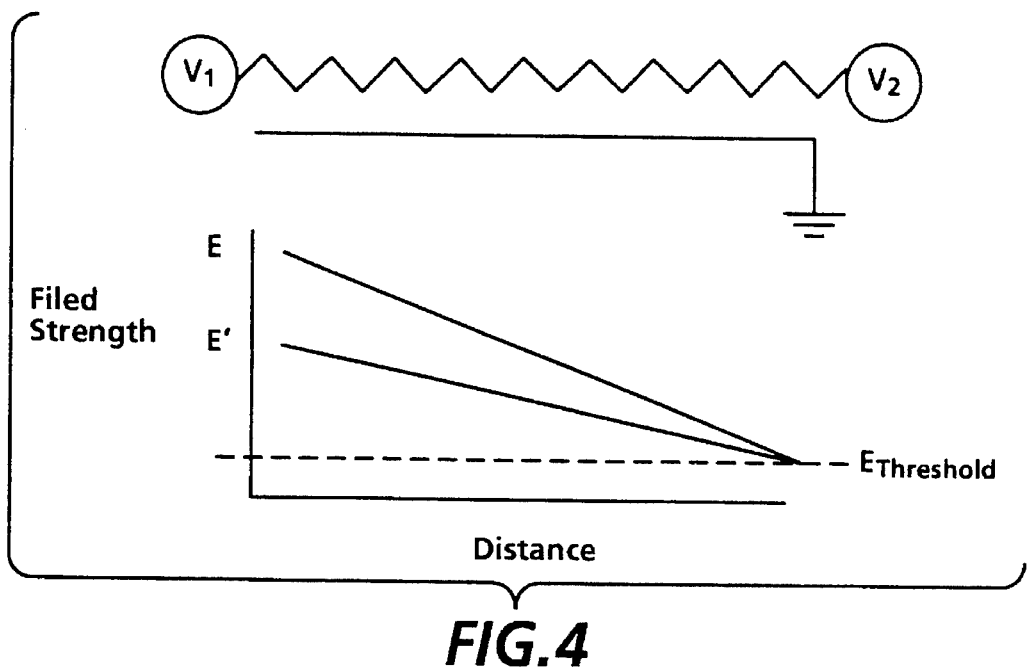
FIG. 4 shows an illustrative relationship between a resistive strip and a ground plane and the electric field gradient created thereby.

Turning now to FIG. 4, it is well known that a resistive strip having each end held at a fixed potential generates a linear potential gradient between its two ends. It is further known, that, if an electrode held at ground potential is placed in some proximity to this resistive strip, an electric field is formed therebetween. It will be seen from FIG. 4 that the electric field formed between the resistive electrode and the equipotential ground plane varies in direct proportion to the variation of the potential along the resistive strip such that the linear potential gradient along the resistive strip produces a linear electric field gradient between the resistive strip and the ground plane. Using the model of FIG. 4, if the resistive electrode shown therein is substituted for electrode 57 in FIG. 3, and the chamber 54 filled with ground electrode is substituted for electrode 53, such that the chamber filled with liquid crystal material is positioned therebetween, the resulting linear electric field distribution creates a linear refractive index distribution. This arrangement effectively creates a gradient index prism suitable for process direction alignment in an electrostatographic printing machine.

Figure 5:
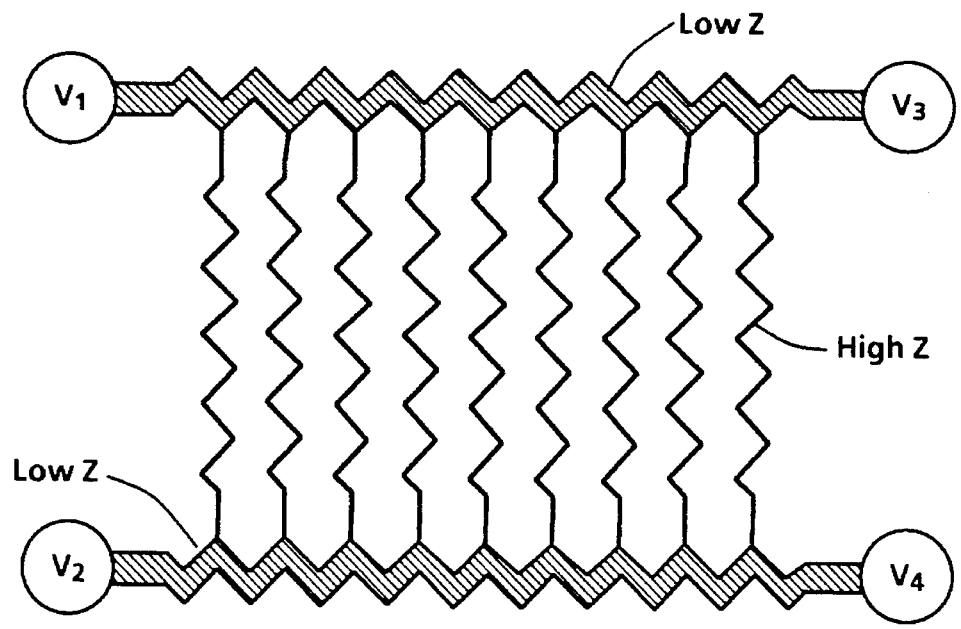
FIG. 5 shows a resistive array as contemplated for use in the present invention.

In accordance with the present invention, the design approach described above is carried one step further by utilizing a parallel array of transparent resistive electrodes 60 connected between two relatively low impedance linear resistors, as shown in FIG. 5. In a preferred embodiment, the parallel horizontal resistors are substantially identical, having a resistive value in the range of about 1–10MΩ, and having a resistance much greater than the parallel vertical resistors, which are also substantially identical, having a resistive value in the range of about 1–100KΩ. A typical high impedance transparent resistor might be fabricated from a material such as indium tin oxide (ITO) while a typical high impedance transparent resistor might be fabricated from a material such as Nichrome, wherein the resistivity of these materials may be controlled through material choice and processing, e.g. ITO oxygenation. Of course, other thin film resistive materials may be used to provide desired results.

In the resistive array shown in FIG. 5, the applied voltages conform with the following relationship: $V_1 > V_2 > V_3 > V_4$, wherein the difference between $V_1$ and $V_4$ is less than the difference between the saturation voltage and the threshold voltage for the liquid crystal material, represented by the difference between $V_A$ and $V_B$ in FIG. 2. This will assure that the liquid crystal cell operates in a range in which the refractive index n is proportional to the applied voltage such that a linear relationship exists therebetween. The resistive electrode array generates a linear potential gradient along the length of the two horizontal resistive electrodes as well as along the length of each resistive electrode coupled between the horizontal electrodes. It will be recognized that the resistive array configuration shown in FIG. 5 provides the capability to create a refractive index gradient along two substantially perpendicular planes.

Figure 6:
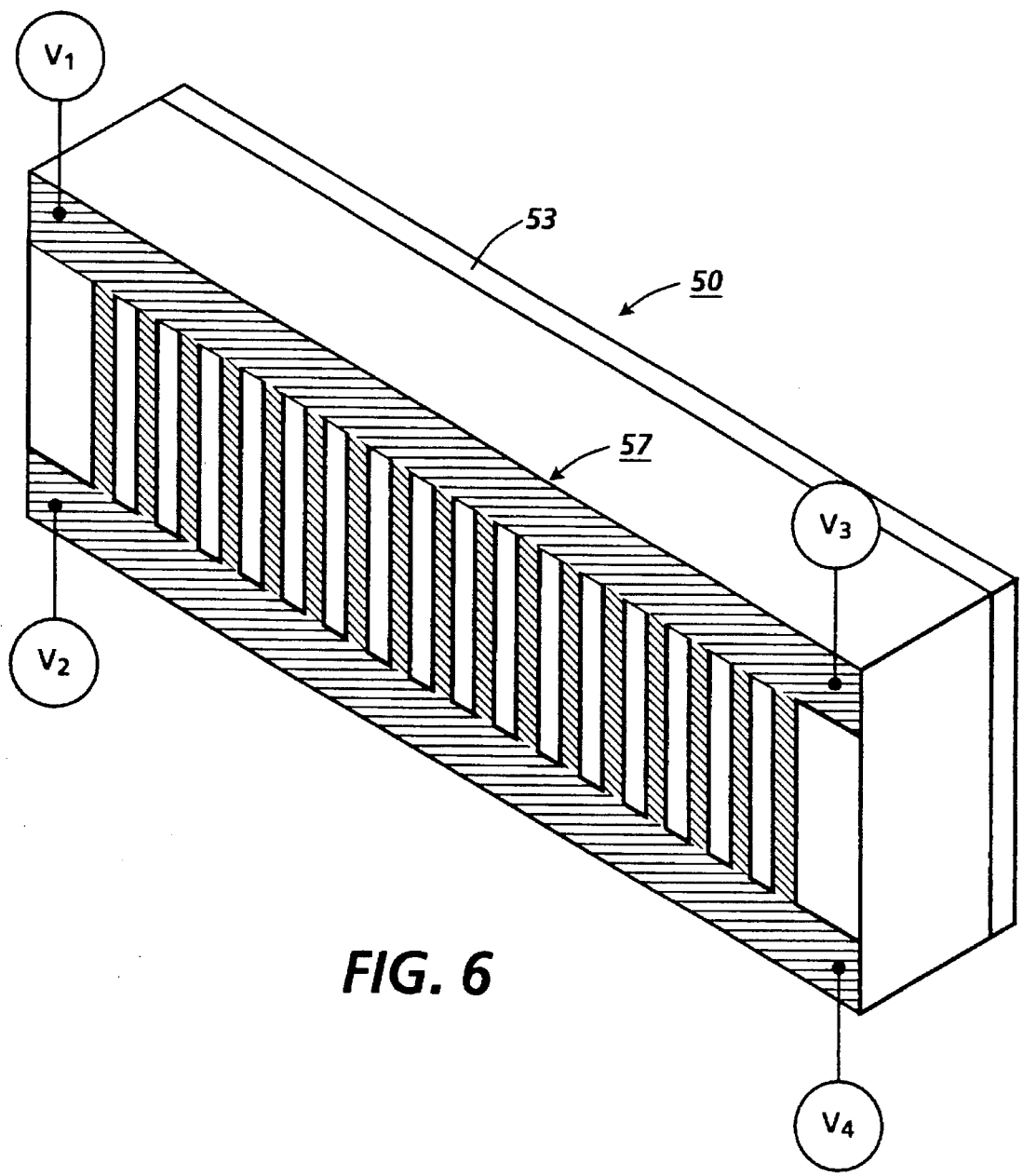
FIG. 6 shows a perspective diagrammatic view of an optical element in accordance with the present invention using the resistive array of FIG. 5 to produce a refractive gradient index.

An optical element in accordance with the present invention using the resistive array of FIG. 5 to produce a refractive index gradient along two planes is shown diagrammatically in FIG. 6. In the configuration of FIG. 6, electrode 53 is connected to ground for forming an equipotential ground plane, while electrode 57 is replaced by a parallel array of transparent resistive electrodes 60, as shown. In this configuration, the voltage differential between voltages $V_1$ and $V_3$ as well as voltages $V_2$ and $V_4$ provide electric field gradients in a first plane, while the voltage differential between the resistive electrode spanning from $V_1$ to $V_3$ and the resistive electrode spanning from $V_2$ to $V_4$ provide electric field gradients along each electrode spanning therebetween in a second plane. In typical operation, voltage $V_1$ will provide a control voltage for the liquid crystal cell, and the voltage differential between voltage points $V_1$ and $V_2$ will be maximized to provide a maximum linear electric field gradient. Voltages $V_3$ and $V_4$, on the other hand, are set substantially equal to one another such that no voltage differential exists along the axis between voltage points $V_3$ and $V_4$. This configuration results in a refractive index gradient along two planes to provide the optical equivalent to a bi-prism suitable for skew correction. In fact, the refractive index gradient system of the present invention, created by providing an inhomogeneous electric field across a liquid crystal cell, is functionally equivalent to a bi-prism shaped cavity filled with liquid crystal material, as described in commonly assigned U.S. patent application Ser. No. 07/951,714 filed on Sept. 25, 1992. The variable prism provided by the present invention is less expensive to fabricate, while providing greater control flexibility through the use of standard liquid crystal cell fabrication techniques.

Figure 7:
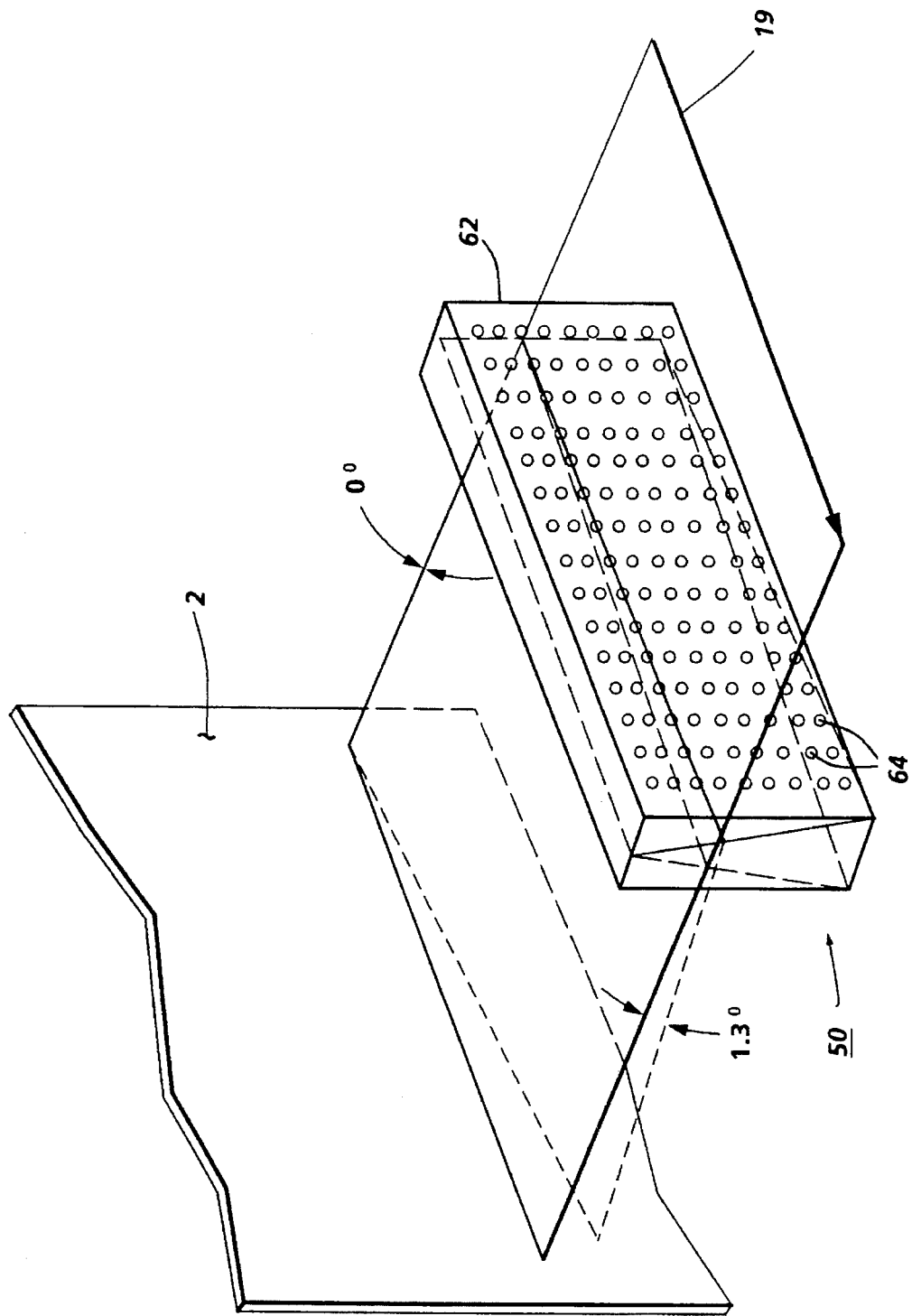
FIG. 7 shows an alternative embodiment of the present invention wherein a two-dimensional electrode array is utilized to produce a refractive gradient index, and also provides a simplified perspective view of the skew correction provided thereby.

An alternative embodiment of the present invention for providing the inhomogeneous electric fields for creating the refractive index gradient prism of the present invention is also contemplated and shown diagrammatically in FIG. 7. This alternative embodiment is enabled through the use of a two-dimensional transparent electrode grid 62 comprising a plurality of individual electrodes 64 which allow the voltage for each electrode in the two-dimensional array to be independently controlled. This notion contemplates that numerous separate and independent voltage sources are provided for applying local potentials to each individual electrode 64 making up grid 62 to create an effective electric field gradient. A practical application of this embodiment could be accomplished by the use of a two-dimensional arrangement of interdigitated electrodes provided with voltage potentials via an integrated circuit power supply. In a preferred embodiment, the voltages applied to each electrode 64 will be linearly distributed, so as to provide an optimal potential distribution for creating the effect of an optical prism it will be understood that the electrode spacing in the grid 62 should be relatively small with respect to the electrooptic material thickness of the liquid crystal cell 50, such that the internal fields will average out so as to appear as a substantially continuous gradient. When the voltages applied to each electrode 64 are linearly distributed, the resulting potential distribution creates an optical prism.

FIG. 7 also illustrates the general principle by which optical element 50 can be used to rectify skew error. As described hereinabove, optical element 50 has variable refractive properties by which a ROS scan line 19 can be rotated relative to the process direction of movement of the imaging member 2 in order to adjust the scan line skew. The configuration of the optical element 50 in accordance with the present invention induces an angular displacement in the transmitted scan line relative to the position of the beam along the length of the optical element 50. As previously discussed, linear variation of the voltages applied to the electrode grid 62 in a manner as described for creating an inhomogeneous electric field through the optical element provides a refractive index gradient along two substantially perpendicular planes which changes the magnitude of angular displacement of the scan line 19. A showing of a biprism created electronically through the use of inhomogeneous fields is shown in phantom for illustrative purposes only, wherein the applied inhomogeneous field creates the effect of the physical structure shown in phantom. The skew adjustment provided by the angular deviation depends on various parameters but could be on the order of approximately 1.3°, as illustrated in FIG. 7. Thus, with properly applied biasing voltages, a refractive index gradient may be produced along two planes in the optical element such that the scan line can be rotated to provide the desired perpendicular relationship between the scan line and the process direction of movement of the imaging plane. Typically, a coarse alignment can be made within an electronic tandem engine to within one half of a pixel width. The present invention provides for the critical adjustment of the optical system on the order of a pixel width of less in real time response to detected error.

Various embodiments of an error detection and feedback control circuit 60, as shown in FIG. 1, are contemplated for determining the existence and extent of the skew alignment error of a scan line on the photoreceptive surface 2 and for controlling the biasing voltages applied to the optical element 50 for controlling the refractive index gradient across the liquid crystal cell necessary to provide proper scan line alignment. Error detection and feedback control circuitry used for this purpose are known in the art. For example, an exemplary system is shown in U.S. patent application Ser. No. 07/740,543, of common assignee, wherein a start of scan sensor emits signals at a frequency equal to the system slow scan resolution while timing marks are sensed by a light source/detector combination to provide the basic timing signals for the synchronization of the control system. The beam is initially aligned and adjusted with some relationship to the occurrences of the photoreceptor timing marks. A phase detector detects the phase difference between the signal from the start of scan detector and the timing marks on the photoreceptor and generates a phase error voltage that is fed to a biasing source which applies an appropriate biasing voltage across the resistive electrodes of the optical element 50 to produce the necessary scan line skew correction.

It will be understood that the positioning of the optical element 50 of the present invention may be placed in various locations in the postscan optics along the scan path of the ROS, preferably in regions along the scan line path where the light beam has a limited divergence angle, or where complications regarding physical configurations do not exist. FIG. 1 shows three possible locations for the optical element 50. Since the size of the optical element and the concomitant quantity of liquid crystal material will have significant impact on the cost of the optical element, it may be preferable to determine a location for the optical element in the scan line path at a position where the length is minimal. The obvious advantageous positions would be directly adjacent the polygon 16 or immediately adjacent the imaging member 2. In practice, a typical ROS is embodied in a modular device including a window from which the light beam is transmitted onto the imaging screen such that substitution of the optical element of the present invention for this window may be desirable.

In recapitulation, there has been shown a device and apparatus for skew correction control in an electrostatographic machine by means of an electrooptic device placed in the optical system of a raster output scanning system. The present invention provides an optical element having a variable refractive index gradient in a configuration which facilitates rotation of the scan line to provide precise angular displacement of the scan line on the photoreceptor. A control system used in combination with the optical element of the present invention may be adapted to monitor the skew of the each scan line and to apply proper voltages to the optical element for changing the refractive index gradient to shift the position of a scan line. A two-dimensional resistive array or an electrode grid arrangement is contemplated for providing a refractive index gradient along two substantially perpendicular planes to produce the desirable refractive index gradient characteristics to provide the desired results.

While the invention has been described with reference to a specific structure as disclosed, it will be appreciated that numerous changes and modifications are likely to occur to those skilled in the art. The present invention is intended to cover all changes and modifications which fall within the true spirit and scope of the invention. Accordingly, the present patent application is intended to embrace all alternatives, modifications, and variations which may fall within the spirit and scope of the following claims.

We claim:

1. An optical element for selective skew correction of a scanning light beam transmitted therethrough, comprising:

a member including a pair of optically transmissive plate members defining a chamber therebetween;

a liquid crystal material substantially filling the chamber, said liquid crystal material having a variable index of refraction responsive to an electric field therethrough; and means for generating an inhomogenous electric field through said liquid crystal material to produce a refractive index gradient across said optical element.

2. The optical element of claim 1, wherein said electric field generating means includes means for producing a refractive index gradient along two substantially perpendicular planes.

3. The optical element of claim 1, wherein said electric field generating means includes a resistive array having a plurality of resistive strips situated on at least one of said pair of optically transmissive plate members.

4. The optical element of claim 3, wherein said resistive array includes:

first and second resistive strips extending parallel to one another; and a plurality of resistive strips extending between said first and second resistive strips, substantially perpendicular thereto.

5. The optical element of claim 1, wherein said electric field generating means includes an electrode grid having a plurality of individually controllable electrodes.

6. The optical element of claim 1, wherein said plate members include a pair of substantially planar parallel external surfaces having a substantially uniform thickness therebetween.

7. The optical element of claim 1, further including means, coupled to said electric field generating means, for applying a biasing voltage across said member to produce an electric field through said liquid crystal material such that the index of refraction of said liquid crystal material is varied as a function of the applied biasing voltage.

8. The optical element of claim 1, wherein said material having a variable index of refraction includes a nematic liquid crystal material.

9. A raster output scanner for providing selective skew alignment correction, comprising:

means for generating a light beam modulated in accordance with a video input data signal;

means for scanning the light beam onto a movable imaging surface being transported in a process direction to provide successive scan lines on the movable imaging surface;

an optical element for selectively deflecting the light beam to correct scan line skew on the imaging surface as a function of voltage applied thereacross, including a member including a pair of optically transmissive plate members defining a chamber therebetween;

a liquid crystal material substantially filling the chamber, said liquid crystal material having a variable index of refraction responsive to an electric field therethrough; and means for generating an inhomogenous electric field through said liquid crystal material to produce a refractive index gradient across said optical element.

10. The raster output scanner of claim 9, further including a voltage source for applying a biasing voltage across said optical element to generate the electric fields through said liquid crystal material such that the index of refraction of said liquid crystal material is varied as a function of the applied biasing voltage.

11. The raster output scanner of claim 9, wherein said electric field generating means includes means for producing a refractive index gradient along two substantially perpendicular planes.

12. The raster output scanner of claim 9, wherein said electric field generating means includes a resistive array having a plurality of resistive strips situated on at least one of said pair of optically transmissive plate members.

13. The raster output scanner of claim 12, wherein said resistive array includes:

first and second resistive strips extending parallel to one another; and a plurality of resistive strips extending between said first and second resistive strips, substantially perpendicular thereto.

14. The raster output scanner of claim 9, wherein said electric field generating means includes an electrode grid having a plurality of individually controllable electrodes.

15. The raster output scanner of claim 9, wherein said plate members include a pair of substantially planar parallel external surfaces having a substantially uniform thickness therebetween.

16. The raster output scanner of claim 9, wherein said material having a variable index of refraction includes a nematic liquid crystal material.

17. The raster output scanner of claim 9, further including:

means for detecting scan line position on the imaging member to generate an error signal in response thereto; and means, responsive to the error signal, for controlling the biasing voltage applied to the optical element for selectively varying the index of refraction thereof.

18. An electrostatographic printing machine of the type in which a raster output scanner produces a modulated light beam wherein the modulated light beam is scanned across a movable photoconductive imaging surface being transported in a process direction for recording latent images thereon, comprising:

means for generating a light beam modulated in accordance with a video input data signal;

means for scanning the light beam onto a movable imaging surface being transported in a process direction to provide successive scan lines on the movable imaging surface;

an optical element for selectively deflecting the light beam to correct scan line skew on the imaging surface as a function of voltage applied thereacross, including a member including a pair of optically transmissive plate members defining a chamber therebetween;

a liquid crystal material substantially filling the chamber, said liquid crystal material having a variable index of refraction responsive to an electric field therethrough; and means for generating an inhomogenous electric field through said liquid crystal material to produce a refractive index gradient across said optical element.

19. The electrostatographic printing machine of claim 18, further including a voltage source for applying a biasing voltage across said optical element to generate the electric fields through said liquid crystal material such that the index of refraction of said liquid crystal material is varied as a function of the applied biasing voltage.

20. The electrostatographic printing machine of claim 18, wherein said electric field generating means includes means for producing a refractive index gradient along two substantially perpendicular planes.

21. The electrostatographic printing machine of claim 18, wherein said electric field generating means includes a resistive array having a plurality of resistive strips situated on at least one of said pair of optically transmissive plate members.

22. The electrostatographic printing machine of claim 21, wherein said resistive array includes:

first and second resistive strips extending parallel to one another; and a plurality of resistive strips extending between said first and second resistive strips, substantially perpendicular thereto.

23. The electrostatographic printing machine of claim 18, wherein said electric field generating means includes an electrode grid having a plurality of individually controllable electrodes.

24. The electrostatographic printing machine of claim 18, wherein said plate members include a pair of substantially planar parallel external surfaces having a substantially uniform thickness therebetween.

25. The electrostatographic printing machine of claim 18, wherein said material having a variable index of refraction includes a nematic liquid crystal material.

26. The electrostatographic printing machine of claim 18, further including:

means for detecting scan line position on the imaging member to generate an error signal in response thereto; and means, responsive to the error signal, for controlling the biasing voltage applied to the optical element for selectively varying the index of refraction thereof.

* * * * *